United States Patent [19]

Holowczenko et al.

[11] Patent Number: 4,757,690
[45] Date of Patent: Jul. 19, 1988

[54] WATER FREEZING ENHANCEMENT FOR THERMAL STORAGE BRINE TUBE

[75] Inventors: Alex Holowczenko, Kirkville; Stephen A. Schoch, Clay; Howard W. Sibley, Baldwinsville, all of N.Y.

[73] Assignee: Carrier Corporation, Syracuse, N.Y.

[21] Appl. No.: 123,194

[22] Filed: Nov. 19, 1987

[51] Int. Cl.⁴ ................................ F25D 3/00
[52] U.S. Cl. .......................... 62/59; 62/69; 62/332; 62/434; 165/133; 165/905
[58] Field of Search ............ 165/133, 905; 62/434, 62/322, 69, 70, 59

[56] References Cited

U.S. PATENT DOCUMENTS

| | | | |
|---|---|---|---|
| 3,207,209 | 9/1965 | Hummel | 165/133 |
| 3,247,678 | 4/1966 | Mohlman | 62/434 |
| 3,609,991 | 10/1971 | Chu et al. | 62/332 |
| 3,653,942 | 4/1972 | Boebel et al. | 165/133 |
| 4,294,083 | 10/1981 | King | 62/434 |

Primary Examiner—Ronald C. Capossela
Attorney, Agent, or Firm—Thomas J. Wall

[57] ABSTRACT

The brine tube of an ice thermal storage tank has a surface enhancement which provides nucleation sites for ice formation, and reduces the need to superchill the water. The tubing enhancement comprises a multiplicity of solid mineral particles distributed evenly over its surface. The particles have jagged, multi-faceted surfaces which adsorb air. When the brine in the tube cools the water to the freezing point, the adsorbed air coalesces into air bubbles that serve as nucleation sites. This permits freezing to initiate a temperature of about 31.5° F.

14 Claims, 1 Drawing Sheet

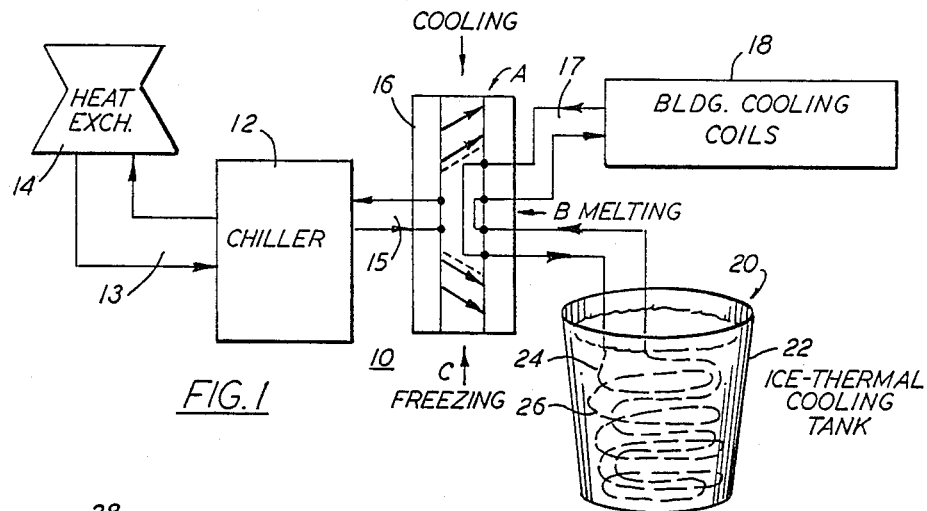
FIG. 1
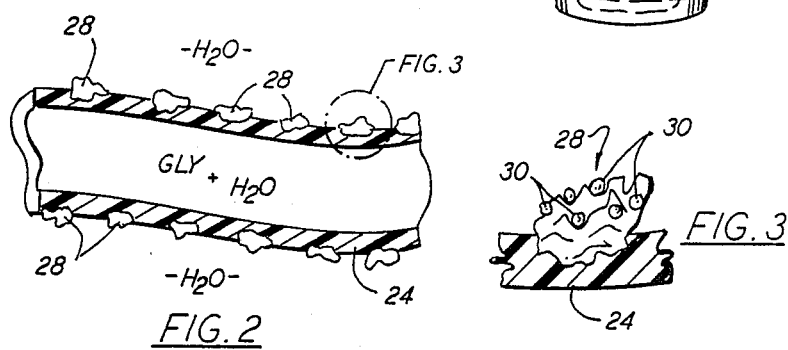
FIG. 2
FIG. 3
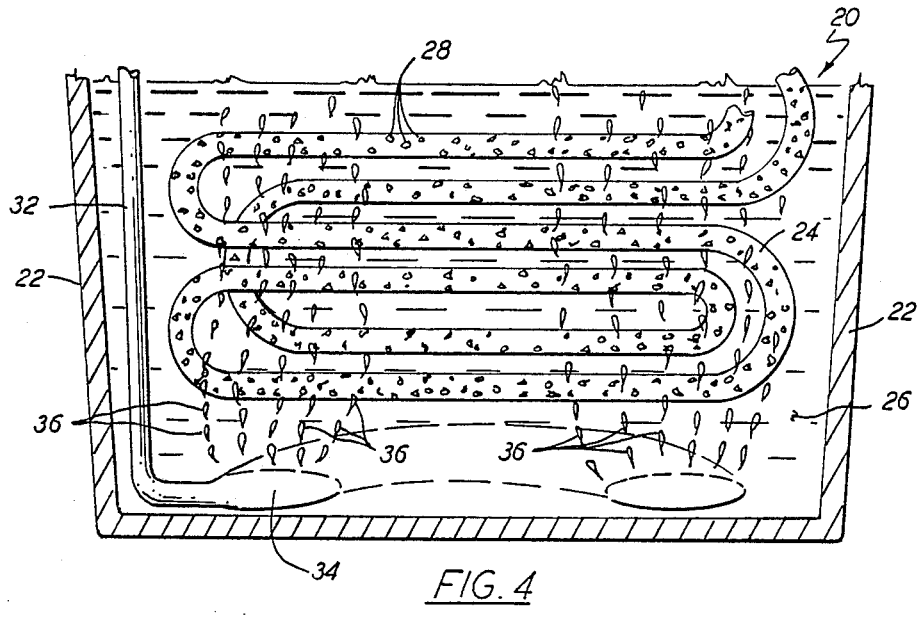
FIG. 4

WATER FREEZING ENHANCEMENT FOR THERMAL STORAGE BRINE TUBE

BACKGROUND OF THE INVENTION

This invention relates to large commercial building air conditioning systems, and is particularly directed to an improvement in the storage of thermal energy for leveling of peak electrical demands required by air conditioning systems. More specifically, the invention is directed to techniques for storing thermal energy by freezing water to ice during off-peak hours, and thereafter, during peak electrical demand hours, by melting the ice for recovering the thermal energy to chill a heat exchange liquid that flows to cooling coils, e.g., of room air units or the like.

With an ice thermal storage tank, it is possible to use the air conditioner chiller at night or weekends, i.e., when the building is closed, to freeze the ice in the tank and store thermal energy. Thereafter, during the next business day the ice can be melted to recover cooling power and cool the office space. This permits a smaller chiller to be used for an equivalent cooling power, which would be run steadily, but at a level well below peak. With the ice thermal storage system, it is possible to shave peak usage during the normal business day when there is an excessive electrical demand.

In a typical ice thermal storage system, there are a number of ice storage tanks provided, each of which comprises a tank enclosure which is filled with water, and a coiled brine tube i.e. heat exchange tube, which can be plastic, copper, or other suitable material, through which a cold brine flows during times that ice is to be produced, and through which warm brine flows during times that the ice is to be used for cooling the building. As used in this application, and as is understood in the art, the term "brine" refers to a heat exchange liquid which will not freeze at the water freezing point, such as ethylene glycol or an aqueous solution of ethylene glycol.

While the freezing point of water is 32° F., it has been found that the water does not freeze spontaneously at that temperature. Rather, it is usually necessary to supercool the water down to about 26° F. to commence ice formation. It is believed that this is necessary because the ice storage tank lacks suitable nucleation points. Attempts to provide the brine tube with a rough or irregular surface have not produced good results.

The requirement to supercool the water below 32° F. is highly disadvantageous. Although the water must be superchilled to 26° F. to freeze, when the ice is later melted to recover the stored cooling power, the ice melts at 32° F., not at 26° F. This temperature difference represents a hysteresis loss, i.e., wasted energy. Further, the air conditioning chillers are designed for a brine temperature of about 35° F. The conventional ice storage system imposes an excessive load on the chiller if it is necessary to cool the brine down to 26° F. to form ice in the tank. There would be a significant reduction in strain on the chiller if it were possible to form ice at a higher temperature, i.e., in the range between 30° and 32° F.

OBJECTS AND SUMMARY OF THE INVENTION

It is an object of this invention to provide an efficient technique for the ice storage of thermal energy.

It is another object of this invention to eliminate the need to supercool water several degrees below the freezing point in a thermal storage ice system.

It is yet another object of this invention to reduce the thermal load on the chiller during a freezing cycle.

It is still another object of this invention to provide simple and economical enhancements for the brine tube of an ice thermal storage tank, which can be easily recharged by a simple technique after a number of freezing and thawing cycles.

It is a yet further object of this invention to provide the brine tube of an ice thermal storage tank system with a freezing enhancement which is reliable and persistent.

It is still a further object of this invention to provide ice nucleating sites on heat transfer surfaces of an ice thermal storage system that reduce or eliminate the requirement for supercooling of water to initiate ice formation.

In accordance with an aspect of this invention, an enhancement is provided for the brine tube of an ice thermal storage tank of the type in which a coil formed of the brine tube is immersed in water in the tank, such that thermal energy is stored by passing cold brine through the tube to freeze the water in the tank to ice, and later the thermal energy is recovered by passing warm brine through the brine tube to melt the ice and chill the warm brine. The tube enhancement comprises a multitude of solid mineral particles that are partially embedded in the outer surface of the tube so that a substantial portion, preferably about 50%, of each of the particles is exposed to the water. These particles have a multi-faceted crystal surface to which particles (i.e. microbubbles) of air are adsorbed. As the heat is extracted from the water, the adsorbed air coalesces into small bubbles, which serve as nucleation sites to facilitate the initiation of ice formation. That is, as the cold brine on the inside of the tube forces the outer part of the tube to the freezing point, the air that is adsorbed on the particle surfaces coalesces into air bubble that dot the surface of each mineral particle. It has been found that water typically freezes at a brine temperature of 31.5° F. when this enhancement is employed. Also, the ice tends to form as a clear sheet, rather than as dendrites more typical of conventional techniques. This ice sheet formation has a higher latent cooling density than dendritic ice resulting in more BTU's of storage cooling per unit volume of ice.

The enhancement particles should be a solid inorganic mineral material, characterized by a jagged multifaceted surface but with little or no capillary porosity. Garnet has been found to perform well in this role, as the air adsorbs to its surface irregularities. A large volume of air is trapped on the solid surface and the immediate subsurfaces.

Although a mineral with capillary porosity may trap more air, there is a tendency for capillaries to fill with water, making recharging difficult after a number of freezing and melting cycles. Consequently, capillary or porous material, such as silica gel, is less advantageous.

It has been found that the adsorbed air provides nucleation sites for at least about twelve freezing and melting cycles. Thereafter, the garnet or other mineral particles can easily be recharged by dispersing bubbles of air throughout the water in the tank. In any commercial or industrial cooling system, this recharging can be carried out on a weekend or on any mild day when the air conditioning is not required.

The above and many other objects, features, and advantages of this invention will be more fully understood from the ensuing description of a preferred embodiment, which should be considered in connection with the accompanying drawing.

BRIEF DESCRIPTION OF THE DRAWING

FIG. 1 is a schematic system diagram for explaining the environment of this invention.

FIG. 2 is a cross-section of a length of brine tube showing the enhancement according to one embodiment of this invention.

FIG. 3 is an enlarged detail view of a portion of FIG. 2.

FIG. 4 is a partial cross-sectional elevation for explaining the recharging feature of this invention.

DETAILED DESCRIPTION OF A PREFERRED EMBODIMENT

With reference to the drawing, and initially to FIG. 1 thereof, the overall environment of this invention can be explained as forming a part of a large building air conditioning system 10. The system 10 comprises a chiller 12, which can be of the centrifugal or reciprocating type, coupled by a heat exchange fluid line 13 to a heat exchanger 14 that exhausts heat to the outer environment. The chiller is also coupled by a fluid line to a valving arrangement 16 which can connect through coolant fluid lines 17 to building cooling coils 18. The latter can typically comprise room units throughout the building. The valving arrangement 16 can also couple the chiller 12 to an ice thermal storage tank system. Here a single tank unit is shown, but is understood to represent a large number of such tanks, normally found in the foundation or lowest level of the building.

The ice thermal storage tank system comprises a tank shell 22 in which a coiled polyethylene brine tube 24 is immersed in water 26 in the tank. The coiled brine tube 24 carries cold brine from the chiller 12 at night or during off peak hours to freeze the water 26, but when the ice is needed for cooling the building, the valve arrangement 16 (position A) is set so that warm brine is received from the building cooling coils 18. The warm brine melts the ice in the tank 20 and gives up heat, chilling the brine. For normal air conditioning operations, the valving arrangement connects the chiller 12 directly to the building cooling coils 18. During off-peak hours or when air conditioning is not required in the building, the chiller 12 is connected through the valving arrangement 16 (position C) to the ice thermal storage tank system 20. During the day, i.e., at peak load periods, the valving arrangement couples the tank 20 directly to the building cooling coils 18 (position B). Cooling is provided from the ice storage tank by passing warm brine from coils 18 through the brine coil 24. The chilled brine in the tube 24 is returned to the coils 18 to cool the building.

In order to facilitate the formation of ice from the cold brine at temperatures within about a degree of the freezing point, typically about 31.5° F., the brine tube 24 is provided with an enhancement such as that shown in FIGS. 2 and 3.

The brine tube 24 is typically made of a polyethylene or other synthetic resin material. Particles 28 of garnet or other suitable multi-faceted mineral particles are distributed evenly over the outer surface of the tube 24. Preferably this is done by heating a multitude of garnet particles 28 to about 400°–500° F. and allowing the solid particles to melt into the plastic surface of the tube 24. These particles do not penetrate completely through the tube wall. Approximately one-half of each particle 28 is buried in the plastic tube, and about one-half of the particle is exposed to the water in the tank 22. The solid particles 28, as shown in more detail in FIG. 3, each have a multi-faceted jagged surface, with a large number of faces. Air tends to adsorb at grain boundaries of the particles 28, so that a large volume of air is trapped at the solid surface or immediately adjacent to the surface. When the particle-enhanced brine tube 24 is immersed in the water 26, and cold brine flows on the inside of the tube and forces the tube down below 32° F., the adsorbed air on the surface coalesces into small air bubbles 30, i.e. microbubbles, typically at the crotches and hollows where the crystal faces meet. These air microbubbles 30 serve as nucleation sites, with the water 26 freezing substantially immediately upon the formation of the microbubbles 30.

It has been found that the initial ice forms at a brine temperature of about 31.5° F., and forms as a clear, nearly invisible sheet or layer. Further cooling of the water 26 causes the ice to build up easily on the inner core of ice without need for supercooling.

It has been found that the adsorbed air at the particle surface persists through about 12 cycles of freezing and melting. After that, the mineral particles 28 can be easily recharged with air, simply by dispersing bubbles of air throughout the water.

As shown in FIG. 4, the recharging of the garnet particles 2S can be accomplished by supplying compressed air through an air line 32 to a sparging unit 34 situated beneath the coil of the brine tube 24 within the tank shell 22. The unit 34 produces a dispersion of small air bubbles 36 within the water 26. These bubbles 36 flood the particles 28, and the air is adsorbed onto the particle surfaces. As has been mentioned earlier, this recharging is required only about once every twelve freeze and melt cycles, i.e., approximately bi-weekly. The system can be programed for automatic recharging at certain times.

While the invention has been described in detail with reference to a preferred embodiment, it should be understood that the invention is not limited to that embodiment. Rather, many modifications and variations would be apparent to those of skill in the art without departing from the scope and spirit of this invention, as defined in the appended claims.

What is claimed is:

1. In a brine tube of the type employed in an ice thermal storage tank in which a coil formed of said tube is immersed in water in the tank, and in which thermal energy is stored by passing cold brine through the tube to freeze the water to ice and the thermal energy is later recovered by passing warm brine through the tube to melt the ice; the improvement wherein a multitude of solid particles are partially embedded in the outer surface of the tube having a substantial portion thereof exposed to the water, the particles having a multifaceted crystal surface to which there are adsorbed microbubbles of air which serve as nucleation sites to facilitate the initial freezing of the water at within one degree F or less below the normal freezing point thereof.

2. The ice thermal storage brine tube of claim 1 in which the tube is formed of a plastic synthetic resin.

3. The ice thermal storage brine tube of claim 2 in which said tube is polyethylene.

4. The ice thermal storage brine tube of claim 2 in which the particles comprise a mineral material distributed substantially uniformly over the surface of the tube.

5. The ice thermal storage brine tube of claim 1 wherein aid particles have little or no capillary porosity.

6. In a tank for storage of thermal energy by freezing to ice of water in the tank by passing of a cold brine through a coil of a brine tube that is immersed in the water in the tank and later recovering the thermal energy by passing warm brine through the coil to chill the brine by melting the ice in the tank, the improvement wherein a multitude of solid particles are partially embedded in the outer surface of the brine tube having a substantial portion thereof exposed to the water in the tank, the particles having a multi-faceted surface to which there are adsorbed microbubbles of air which serve as nucleation sites to facilitate the initial freezing of the water at temperatures within one degree F or less below the normal freezing point thereof.

7. The thermal storage tank of claim 6 in which said tube is formed of a plastic synthetic resin.

8. The thermal storage tank of claim 7 in which said particles comprise a mineral material distributed substantially uniformly over the outer surface of the tube.

9. The thermal storage tank of claim 7 wherein said particles have little or no capillary porosity.

10. The thermal storage tank of claim 6 further comprising sparging means disposed in said tank beneath said coil for periodically dispersing air bubbles in the water in said tank and thus recharging the particles when needed.

11. Method of ice storage of thermal energy comprising passing a cold brine through a brine tube that is immersed in a tank of water, said brine tube including a multiplicity of particles partially embedded in an outer surface thereof and having a substantial portion thereof exposed to the water, the particles having multifaceted surfaces to which there are adsorbed microbubbles of air which serve as nucleation sites to facilitate the initial freezing of the water to ice, said cold brine being at a temperature within about one degree F below the freezing point of the water 12. The method of ice storage of claim 11 further comprising recovering the stored thermal energy by passing a warm brine through the tube to melt the ice and thereby chill the brine.

13. The method of ice storage of claim 12 further comprising the step of dispersing bubbles of air in the water to recharge said particles.

14. The method of ice storage of claim 11 wherein said cold brine is at a temperature of about 31.5° F.

* * * * *